May 15, 1934.                 C. H. WILLIS                  1,959,188
                    ELECTRIC VALVE CONVERTING APPARATUS
                           Filed Nov. 15, 1933
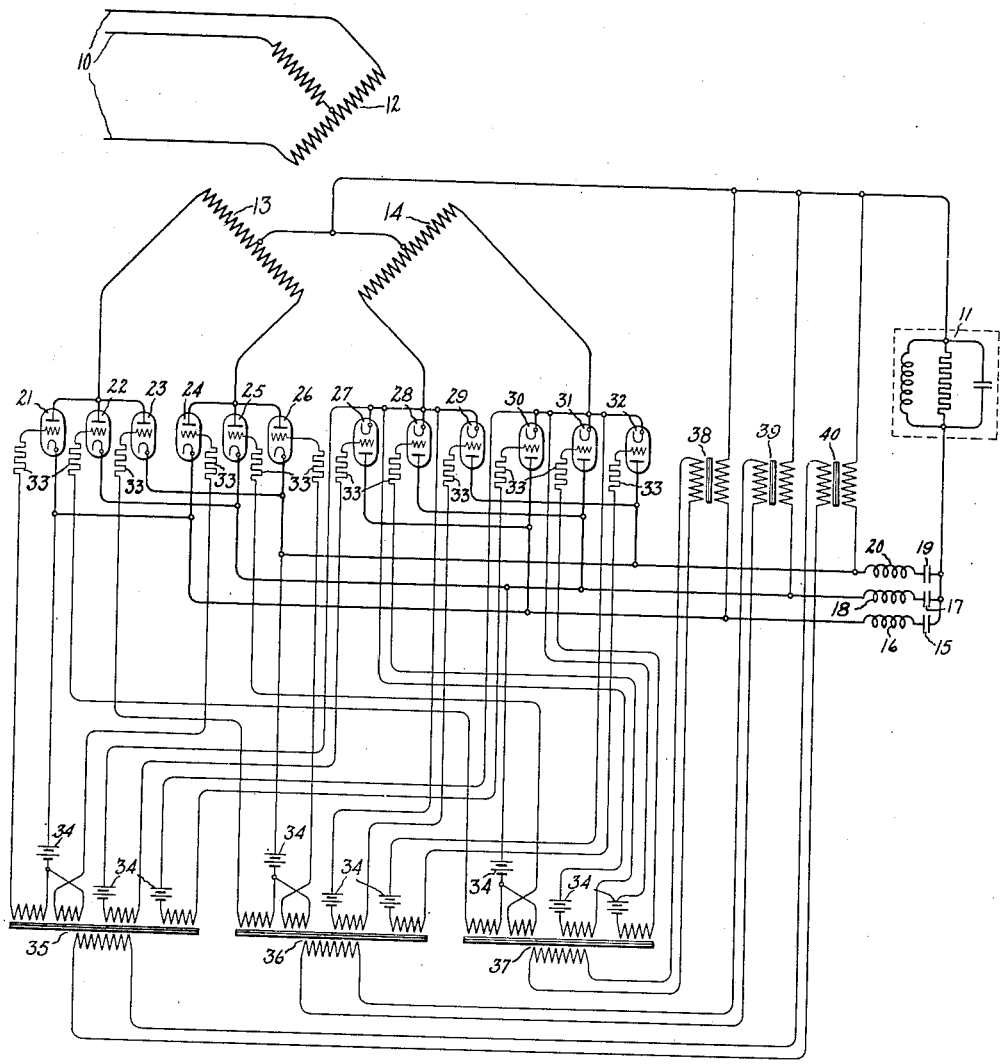
Inventor:
Clodius H. Willis,
by Harry E. Dunham
His Attorney.

Patented May 15, 1934

1,959,188

UNITED STATES PATENT OFFICE 1,959,188

ELECTRIC VALVE CONVERTING APPARATUS

Clodius H. Willis, Princeton, N. J., assignor to General Electric Company, a corporation of New York Application November 15, 1933, Serial No. 698,119

5 Claims. (Cl. 172—281)

My invention relates to electric valve converting apparatus and more particularly to such apparatus suitable for transmitting energy from a lower frequency alternating current supply circuit to a higher frequency alternating current load circuit.

Heretofore there have been devised numerous electric valve converting apparatus for transmitting energy between direct and alternating current circuits, direct current circuits of different voltages, or independent alternating current circuits of the same or different frequencies. The use of valves of the vapor electric discharge type has found particular favor in such apparatus because of the relatively large amounts of energy which may be handled at ordinary operating voltages. It is well understood that satisfactory operation of a valve of this type is dependent upon the condition that its control electrode shall regain control of its conductivity during each interval after current has been interrupted in the valve by forcing its anode negative with respect to its cathode and before the potential across the valve reverses polarity. In order for the grid, or control electrode, to regain control of the conductivity of the valve, it is necessary that it shall have become substantially completely deionized during this interval while its anode potential is negative. A definite time is required for this deionization of an electric valve, that is, the recombination of the contained ions into an electrically neutral vapor, and the majority of the circuits of the prior art place a definite limit on the interval during which its anode potential is maintained negative. Thus, this deionization time places a definite limit upon the upper frequency at which apparatus utilizing these valves may operate, while in certain cases it is desired to operate the apparatus at a frequency above this upper limit.

It is an object of my invention to provide an improved electric power converting apparatus utilizing electric valves which will overcome the above-mentioned disadvantages of the arrangements of the prior art, and which will be simple, economical and reliable in operation.

It is another object of my invention to provide an improved electric valve converting apparatus utilizing electric valves of the vapor discharge type capable of converting alternating current of one frequency into alternating current of very high frequencies, in which an adequate deionization time is provided for the electric valves.

It has also been proposed heretofore to transmit energy from an alternating current circuit of a lower frequency to an alternating current circuit of a higher frequency by converting apparatus of the series type, that is, apparatus relying upon the successive charging and discharging operations of a condenser, preferably forming a part of an oscillating circuit. In the arrangements of the prior art the high frequency output of such an apparatus is modulated or varied in amplitude at the frequency of the low frequency circuit, the amplitude approaching zero at the zero point in the cycle of the supply voltage. On the other hand, it is desirable to have a high frequency output which is substantially constant in amplitude.

It is a further object of my invention to provide an improved electric valve converting apparatus for transmitting energy from a lower frequency alternating current supply circuit to a higher frequency alternating current load circuit in which the amplitude of the higher frequency alternating current is substantially constant.

In accordance with one embodiment of my invention, I have devised an apparatus for transmitting energy from a polyphase alternating current supply circuit to a single-phase higher frequency alternating current load circuit. This apparatus comprises a plurality of oscillating circuits resonant at substantially the frequency of the load circuit. A capacitor in each of the oscillating circuits is adapted to be charged to a given polarity with rectified current derived from one phase of the supply circuit through a plurality of electric valves, and to be charged to an opposite polarity with rectified current derived from a different phase of the supply circuit through another group of electric valves. The several electric valves controlling the charging and discharging of the capacitors of the several oscillating circuits are rendered conductive successively, while the several oscillating circuits are connected to a common load circuit. With each charging operation of a capacitor, current impulse is supplied to the load circuit which is substantially sinusoidal in wave form and of the frequency of the load circuit. By staggering the operation of the electric valves associated with the several oscillating circuits, these current impulses combine to provide a single continuous alternating current of a higher frequency. With such an arrangement, each electric valve operating as a rectifier to charge a capacitor from a phase of the supply circuit is active for only a single current impulse and is then idle during the periods that the corresponding valves of the other resonant circuits are active, and during this idle period its anode potential is maintained negative with respect to its cathode so that its deionization time may amount to many times its active period.

For a better understanding of my invention, together with other and further objects thereof, reference is had to the following description taken in connection with the accompanying drawing, and its scope will be pointed out in the appended claims. The single figure of the drawing is a diagrammatic representation of my invention for transmitting energy from a three-phase lower frequency alternating current supply circuit to a singe-phase higher frequency alternating current load circuit.

Turning now to the drawing, there is illustrated an arrangement for transmitting energy from a three-phase alternating current supply circuit 10 of lower frequency to a single-phase alternating current load circuit, or device, 11, of higher frequency, the load circuit 11 being diagrammatically illustrated as comprising inductance, resistance, and capacitance. This apparatus includes a Scott-connected transformer provided with a three-phase primary network 12 connected to the circuit 10 and secondary phase windings 13 and 14 with their electrical neutrals interconnected to form a quarter-phase system. The apparatus also includes an oscillating circuit comprising a capacitor 15 and a reactor 16. The capacitor 15 is connected to be charged to a given polarity with rectified current from the phase winding 13 through electric valves 21 and 24 connected with the winding 13 in a conventional manner to secure full wave rectification. The capacitor 15 is also connected to be charged to an opposite polarity with rectified current derived from the phase winding 14 through electric valves 27 and 30, also connected to secure full wave rectification. It will be noted that the load device, or circuit, 11, is included in both of the charging circuits of the capacitor 15 so that the current impulses comprising the charging currents of the capacitor 15 will flow through the load circuit.

This apparatus also includes the oscillating circuit comprising a capacitor 17 and a reactor 18 similarly connected to be charged to one polarity through electric valves 22 and 25 and to the other polarity through electric valves 28 and 31. The third oscillating circuit, comprising capacitor 19 and reactor 20, is similarly connected to be charged to one polarity through electric valves 23 and 26 and to the other polarity through electric valves 29 and 32. Again it is to be noted that the load circuit 11 is common to the charging circuits of all of the capacitors 15, 17 and 19. Each of the several electric valves 21–32, inc., is provided with an anode, a cathode and a control electrode, or grid, and may be of any of the several types well known in the art, although I prefer to use valves of the vapor electric discharge type.

The control of the conductivity of the pairs of valves 21, 24 and 27, 30 is effected by connecting their control electrodes or grids to their respective cathodes through current limiting resistors 33, negative bias batteries 34, and the secondary windings of a control transformer 35. Similarly, the control of the charging of the capacitor 17 is effected by connecting the control electrodes, or grids, of the pairs of valves 22, 25 and 28, 31 to their respective cathodes through current limiting resistors 33, negative bias batteries 34 and the secondary windings of a control transformer 37, while the control of the pairs of valves 23, 26 and 29, 32 is effected through similar connections of their grids to the control transformer 36. The primary windings of the control transformers 35, 36 and 37 may be energized from any suitable source of polyphase alternating current of a frequency one-third of that which it is desired to supply the load circuit 11, or if desired, the apparatus may be self-excited, as illustrated. In the latter case, the primary windings of the control transformers 35, 36 and 37 may be energized in accordance with the voltage across the several oscillating circuits through the transformers 40, 39 and 38, respectively. The connections are such that the primary winding of each control transformer is energized from the voltage across the oscillating circuit which has been active immediately preceding the oscillating circuit which is controlled by the particular control transformer. Thus, the operation of each oscillating circuit is effective to initiate the operation of the sequentially successive oscillating circuit.

In explaining the operation of the above described apparatus, it will be assumed that, initially, the electric valves 21 and 24 are rendered conductive. These valves, together with the winding 13 operate as a full wave rectifier charging the capacitor 15 through the load circuit 11. Due to the inductance of the reactor 16, which, with the capacitor 15 and the reactance of the load circuit 11 is tuned to substantially the frequency of the load circuit 11, the capacitor 15 will oscillate to substantially twice the instantaneous unidirectional potential supplied by the rectifier comprising the winding 13 and the valves 21 and 24. When the current ceases to flow, upon the complete charge of the capacitor 15, the potential of the capacitor 15 will be effective to render the anodes of the electric valves 21 and 24 negative with respect to their cathodes in the well known manner of series converting apparatus. At the same time, this voltage appearing across the oscillating circuit 15—16 will excite the control transformer 37 through the transformer 38 with such a polarity that the grids of the electric valves 28 and 31 are energized to render these valves conductive, while the electric valves 22 and 25, associated with the same oscillating circuit, are maintained non-conductive. The capacitor 17 is thus charged with a unidirectional current derived from the rectifier comprising the winding 14 and the electric valves 28 and 31 to a polarity opposite that to which the capacitor 15 was just charged, the charging current flowing in an opposite direction through the load circuit 11. This impulse of charging current constitutes the second half cycle of alternating current for the load circuit. As in the case of capacitor 15, the capacitor 17 will become charged to such a potential as to maintain a negative anode potential on electric valves 28 and 31 and maintain them non-conductive. Similarly, the building up of potential across the oscillating circuit 17—18 is effective to excite the control transformer 36 through the transformer 39 to render conductive electric valves 23 and 26, which charge the capacitor 19 to a polarity similar to that of 15, supplying a succeeding half cycle of high frequency alternating current to the load circuit 11. The charging of the capacitor 19 then excites the transformer 35 through the transformer 40 to render conductive electric valves 27 and 30 to charge the capacitor 15 to an opposite polarity.

In this manner, the capacitors 15, 17 and 19 are successively charged to opposite polarities, each charging operation of a capacitor, upon its completion, serving to initiate a charging operation of the sequentially successive capacitor. Each charging operation of these capacitors is effective to supply a half cycle of higher frequency alternating current to the load circuit 11, the several charging impulses combining to form a continuous higher frequency alternating current. One valve of each of the pairs 21, 24; 22, 25; etc., is active for one-half cycle of the high frequency current and is then idle for five half cycles of high frequency current, and a negative anode potential is maintained on each of these valves during a large portion of the five half cycles of higher frequency alternating current. In other words, the time during which each valve is maintained with a negative anode potential is substantially greater than that time during which it is active, so that the deionization time of the valves is very greatly increased. Obviously, since the upper frequency limit is determined by the deionization time, the above described apparatus is capable of operating at much higher frequency than the conventional apparatus of the prior art.

It will be noted that each capacitor is charged to one polarity from one phase winding and to the opposite polarity from the other phase winding. With such an arrangement, the magnitude of the potential impressed upon a capacitor from one phase winding is a maximum when that effective to charge the capacitor to an opposite polarity from the other phase winding is a minimum and vice versa. Since the effective charging current of the capacitors, and thus the current supplied to the load circuit 11, is dependent upon the difference in the potentials to which a capacitor is charged with opposite polarities, it is apparent from the foregoing that this difference in the potentials derived from the two phase windings is substantially constant. In case they were both derived from the same phase winding, the difference would vary from substantially four times the maximum instantaneous value of the alternating potential at the peak of the wave of the supply voltage to substantially zero at the zero point. Thus, the fluctuation in the amplitude of the alternating current supplied to the load circuit, or in other words, the modulation, is reduced to a very small value.

While I have illustrated my invention as embodied in an electric valve converting apparatus for transmitting energy from a three-phase alternating current supply circuit, it will be obvious to those skilled in the art that it is equally applicable to the transmission of energy from a polyphase alternating current supply circuit of any number of phases. Also it will be apparent that instead of three oscillating circuits, as described in the present embodiment, any number of oscillating circuits may be utilized, the larger the number, the longer the deionization period of the several electric valves. By the terms "higher" and "lower" frequency alternating current circuits, it is not meant that my invention is limited to any definite frequencies for the supply and load circuits, but these terms are used only in a relative sense.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:—

1. An electric valve converting apparatus for transmitting energy from a lower frequency alternating current supply circuit to a higher frequency alternating current load circuit comprising a plurality of oscillating circuits, each including a capacitor and a plurality of electric valves, a circuit for charging each of said capacitors from said supply circuit to a predetermined polarity including a group of its associated valves, a circuit for charging each of said capacitors from said supply circuit to an opposite polarity including another group of its associated valves, and means for rendering alternately conductive the groups of valves connected to charge each of said capacitors to opposite polarities and for rendering conductive the groups of valves associated with the several capacitors in a predetermined sequence.

2. An electric valve converting apparatus for transmitting energy from a lower frequency alternating current supply circuit to a higher frequency alternating current load circuit comprising a plurality of oscillating circuits resonant at substantially the frequency of the load circuit, each of said oscillating circuits including a capacitor and a plurality of electric valves, a circuit for charging each of said capacitors from said supply circuit to a predetermined polarity including a group of its associated valves, a circuit for charging each of said capacitors from said supply circuit to an opposite polarity including another group of its associated valves, and a control circuit for exciting the groups of valves of each oscillating circuit in accordance with the voltage across another of said oscillating circuits, whereby said oscillating circuits are active in a predetermined sequence, the groups of valves associated with each capacitor being rendered conductive alternately at a frequency substantially equal to the frequency of said load circuit divided by the number of oscillating circuits.

3. An electric valve converting apparatus for transmitting energy from a lower frequency polyphase alternating current supply circuit to a higher frequency alternating current load circuit comprising a capacitor, a circuit for charging said capacitor with rectified current from one phase of said supply circuit including an electric valve, a circuit for charging said capacitor to an opposite polarity with rectified current from another phase of said supply circuit including another electric valve, and means for successively rendering said valves alternately conductive and non-conductive.

4. An electric valve converting apparatus for transmitting energy from a lower frequency polyphase alternating current supply circuit to a higher frequency alternating current load circuit comprising a plurality of oscillating circuits, each including a capacitor and a plurality of electric valves, a circuit for charging each of said capacitors to a predetermined polarity with rectified current from one phase of said supply circuit including a group of its associated valves, a circuit for charging each of said capacitors to an opposite polarity with rectified current from another phase of said supply circuit including another group of its associated valves, and means for rendering alternately conductive the groups of valves connected to charge each of said capacitors to opposite polarities and for rendering conductive the groups of valves associated with the several capacitors in a predetermined sequence.

5. An electric valve converting system comprising a source of lower frequency alternating current, a higher frequency alternating current load circuit, a plurality of oscillating circuits each including a capacitor, a plurality of groups of electric valves, each connected to charge one of said capacitors from said source to a predetermined polarity, a plurality of other groups of electric valves, each connected to charge one of said capacitors from said source to an opposite polarity, and means for rendering alternately conductive the groups of valves connected to charge each of said capacitors to opposite polarities and for rendering conductive the groups of valves associated with the several capacitors in a predetermined sequence.

CLODIUS H. WILLIS.